April 7, 1970     R. P. LEHMANN ET AL     3,504,781
MANUFACTURING TRANSFER SYSTEM
Filed Feb. 5, 1968     2 Sheets-Sheet 1
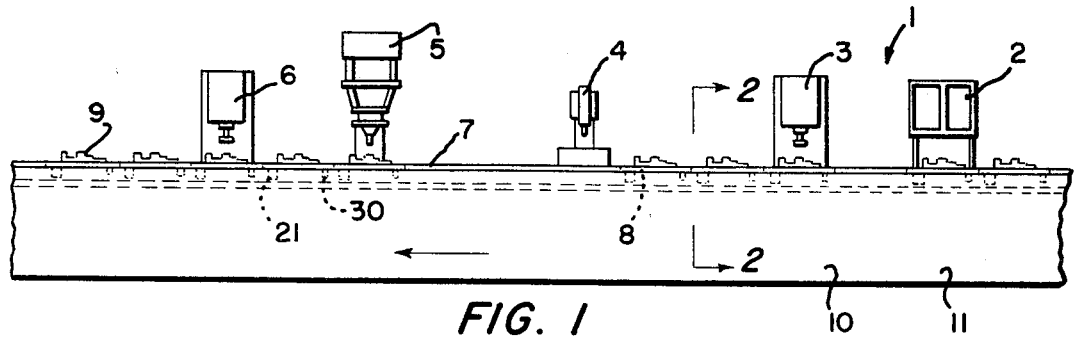
FIG. 1
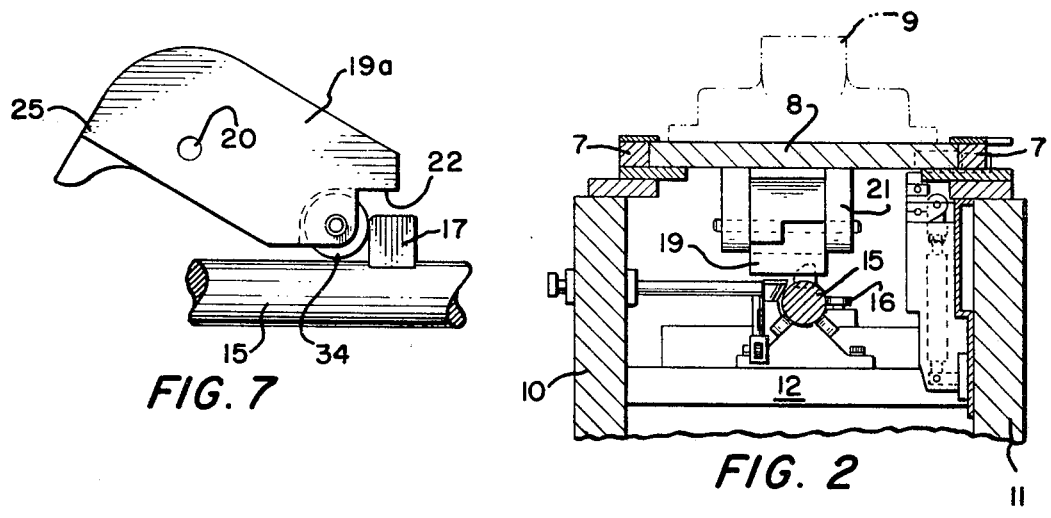
FIG. 7
FIG. 2
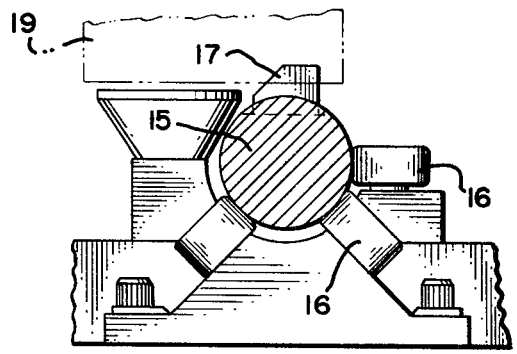
FIG. 3
INVENTOR.
RICHARD P. LEHMANN
ROBERT J. SECCOMBE
BY
ATTORNEY INVENTOR.
RICHARD P. LEHMANN
ROBERT J. SECCOMBE
BY David W. Tilhott
ATTORNEY

United States Patent Office 3,504,781
Patented Apr. 7, 1970

---

3,504,781
MANUFACTURING TRANSFER SYSTEM
Richard P. Lehmann, Lansing, and Robert J. Seccombe, Dearborn Heights, Mich., assignors to Ingersoll-Rand Company, New York, N.Y., a corporation of New Jersey
Filed Feb. 5, 1968, Ser. No. 702,979
Int. Cl. B65g 25/12
U.S. Cl. 198—19
5 Claims

ABSTRACT OF THE DISCLOSURE

A transfer system for conveying workpieces along a manufacturing line through successive work stations including a longitudinal row of pallets movably supported and guided along a path extending through the work stations, a reciprocating transfer bar extending along the path under the pallets and carrying means to engage the pallets and carry them along during its forward stroke and means to disengage the pallets during the rearward stroke of the transfer bar. Means is provided to disengage each individual pallet from the transfer bar during its forward stroke in the event that the individual pallet arrives at a work station or nears a preceding pallet so that the individual pallet can remain stationary while other pallets can move forwardly during the following forward stroke of the transfer bar. Allowing the pallets to remain stationary while the other pallets continue moving prevents the immediate stoppage of a manufacturing line in the event a single work station has a temporary interruption or is slower than usual. Also, the allowance for "float" of pallets allows individual work stations to vary cycle times without interfering with other work stations.

BACKGROUND OF INVENTION

This invention relates generally to a conveyor transfer system for transporting pallets carrying workpieces between a plurality of work stations and more particularly to a work transfer system which will allow some of the pallets to "float" or to stop and remain in stationary positions either between stations or at stations while the remainder of the pallets continue on toward other stations. This type of transfer system is desirable in order to prevent complete stoppage of the transfer line if one station should temporarily stop or require a longer time than usual to complete a work operation.

An example of a transfer system of this type is disclosed in U.S. Patent No. 3,088,197, dated May 7, 1963, issued to D. A. Cargill, now reissued as Re. 25,886. The system described in this patent uses a conveyor chain which travels continuously forward along the transfer line and pallets having a sprocket engaging the chain and a clutch which releases the sprocket allowing it to rotate freely when the pallet is stopped and which locks the sprocket against rotation when the pallet moves forward.

SUMMARY OF INVENTION

The principal object of this invention is to provide a novel and relatively simple transfer system that allows pallets to "float" or stop while other pallets continue moving.

Other important objects are: to provide a transfer system which allows pallets to "float" and which uses a reciprocating transfer bar that simultaneously moves pallets forward and stops them; and to provide a simple and economical mechanism for providing "float" to a transfer line.

In brief, this invention includes a longitudinal row of pallets movably supported and guided along a path extending through a plurality of work stations, a reciprocating transfer bar for engaging the pallets during its forward stroke and moving them forward in a step-by-step manner, and dog means on each pallet to engage the transfer bar during the forward stroke of the transfer bar to transmit the motion of the transfer bar to the pallet and operative to be automatically disengaged from the transfer bar when the pallet nears a preceding pallet or arrives at a work station. Cam means are mounted on each pallet to disengage the dog means of a following pallet when the following pallet nears the preceding pallet and similar cam means are provided at each work station for movement into and from a position for automatically disengaging the dog means of a pallet arriving at that work station.

BRIEF DESCRIPTION OF DRAWINGS

The invention is described in connection with the accompanying drawings wherein:

FIG. 1 is an elevational view of a transfer line utilizing this invention;

FIG. 2 is an enlarged transverse section taken on line 2—2 of FIG. 1;

FIG. 3 is an enlarged fragment of FIG. 2;

FIG. 7 is an elevational view of a modified dog for engaging the transfer bar.

DESCRIPTION OF PREFERRED EMBODIMENTS

Figure 4:
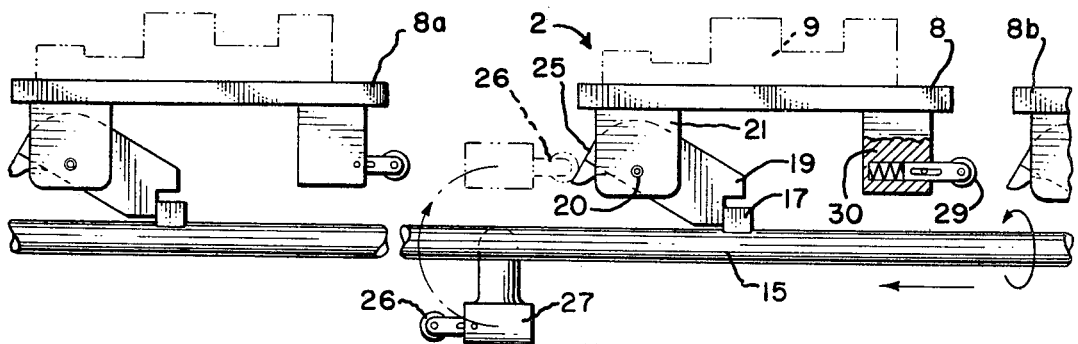
FIG. 4 is an enlarged elevational view schematically illustrating a pair of pallets moving along the transfer line with the transfer bar in the middle of its forward stroke.

FIG. 1 shows a work transfer line 1 in a manufacturing operation employing five work stations numbered 2, 3, 4, 5 and 6. The transfer line includes a pair of conventional tracks or guides 7 extending through the work stations and supporting and guiding a longitudinal row of pallets 8 carrying work pieces 9. FIG. 2 shows the tracks 7 as being a pair of horizontally-spaced U-shaped members slidably embracing the longitudinal edges of a pallet 8. The tracks 7 are supported on a frame 10 which includes a pair of horizontally-spaced vertical standards 11 interconnected by a horizontal cross member 12. All of the foregoing is conventional in the transfer line art.

A reciprocating transfer bar 15 is movably mounted on plural rollers 16 supported on the cross members 12, which allow the transfer bar 15 to reciprocate freely. The transfer bar 15 extends along under the row of pallets 8 and carries a series of longitudinally spaced lugs 17 adapted to engage abutments on individual pallets 8 for moving the pallets forward during the forward stroke of the transfer bar 15. After the transfer bar 15 reaches the end of its forward stroke, it rotates the lugs 17 about 90 degrees so they will clear the pallets during the rearward stroke of the bar 15. At the end of its rearward stroke, the transfer bar again rotates to return the lugs 17 to their upstanding position where they can engage and force the pallets forwards during the next forward stroke of the transfer bar. Conventional fluid pressure cylinders are normally used for reciprocating and rotating the transfer bar 15. These cylinders are not shown because they are conventional.

Means is provided for automatically releasing individual pallets 8 from the lugs 17 on the transfer bar 15 when it is desirable for the pallet or pallets to remain stationary while remaining pallets 8 can continue moving forward. Looking at FIG. 4, a dog 19 is pivoted on a pivot 20 extending between depending flanges 21 attached to the underside of a pallet 8. The dog 19 is shaped and weighted so that its rear end will fall by gravity into an engaging position with a lug 17 on the transfer bar 15. The rear end of the dog 19 includes a notch 22 adapted to engage the lug 17 in a correct manner.

Figure 5:
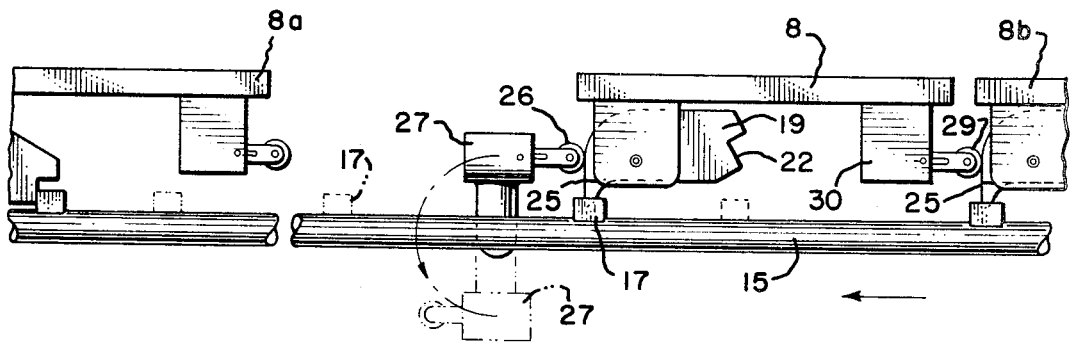
FIG. 5 is similar to FIG. 4 with the transfer bar at the end of its forward stroke.

The front portion of the dog 19 extends forward beyond the pivot 20 and includes a cam follower surface 25 adapted to engage a cam to lift the rear end of the dog 19 out of engagement with the lug 17. FIG. 5 shows the dog 19 moved to its disengaging position.

FIG. 4 illustrates the pallet 8 arriving at a work station 2 during a forward stroke of the transfer bar 15. A pallet 8a has passed the work station 2 previously and a pallet 8b is closely following the pallet 8. The pallets 8, 8a and 8b are identical and have different reference numbers merely to distinguish the individual pallets. The pallet 8 is stopped by the cam follower surface 25 of the dog 19 engaging a station cam 26 fixed on a movable arm 27. The arm 27 can be moved between the solid line and dotted line positions shown in FIG. 4 to move the cam 26 into a position where it will engage the dog 19 as the pallet 8 arrives at the station 2.

As the moving pallet 8 forces the cam follower surface 25 of the dog 19 against the cam 26, the dog 19 is forced to pivot out of engagement with the lug 17, as shown in FIG. 5, whereby the pallet 8 stops and the lug 17 continues forward to the end of its forward stroke as shown in FIG. 5. The forward end of the dog 19 is cut away at its side to eliminate being engaged by the lug 17 in the position shown in FIG. 5.

Figure 6:
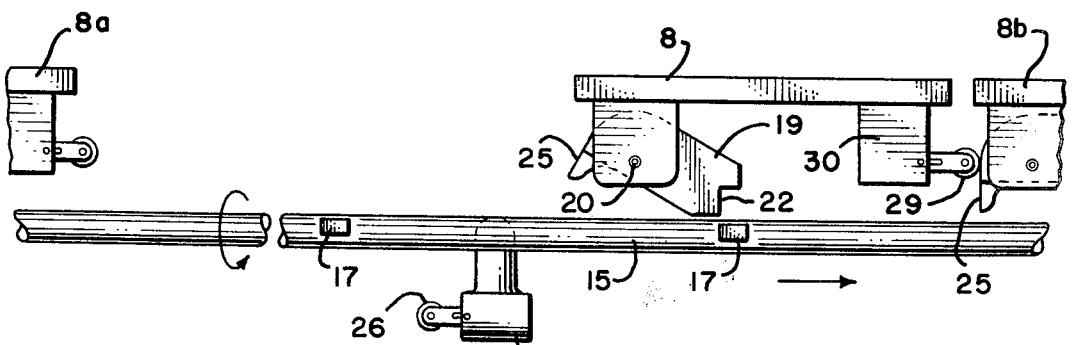
FIG. 6 is similar to FIG. 4 and showing the transfer bar during its rearward or retraction stroke.

As mentioned previously, when the transfer bar 15 arrives at the end of its forward stroke, it rotates the lugs 17 about 90 degrees and begins its rearward stroke as shown in FIG. 6. At the end of its rearward stroke, the transfer bar 15 will rotate to return the lugs 17 to their upstanding position and begin its forward stroke.

The pallet 8 will remain stationary at the work station 2 so long as its dog 19 remains in its disengaged position. When the operation at the work station 2 is completed, the cam arm 27 will be returned downward to its storage position whereupon the dog 19 will fall by gravity into a position where it will again engage the lug 17 as it moves forward on its next stroke.

During the time that the pallet 8 is stopped at the work station 2, the following pallet 8b must also stop or "float" while the remainder of the pallets such as the preceding pallet 8a can move on. Means is provided for automatically causing the pallet 8b to "float." A pallet cam 29 is mounted on the trailing end of the pallet 8 in a bracket 30 attached to the underside of the pallet 8. The pallet cam 29 projects rearwardly where it will engage the cam surface 25 of the dog 19 on the pallet 8b as the pallet 8b is pushed toward the stopped pallet 8.

The pallet cam 29 engages the cam surface 25 of the dog 19 on the pallet 8b to lift the dog 19 into its disengaged position as shown in FIG. 5. As soon as the dog 19 is disengaged from the lug 17, the pallet 8b stops and the transfer bar 15 continues its forward stroke. In the event that other pallets are closely following the pallet 8b, they will also automatically stop and "float" in the same manner.

FIG. 4 illustrates the pallet cam 29 as being resiliently mounted on its bracket 30 for absorbing shocks created by the pallet 8b being pushed forwardly against the stopped pallet 8.

FIG. 7 illustrates a modified dog 19a having a roller 34 pivoted on its rear end in the notch 22 for engaging the lug 17. The use of the roller 34 is believed to aid in reducing wear problems created by the engagement between the lug 17 and the dog 19.

While a plurality of embodiments are illustrated and described, it should be understood that this invention is not limited merely to the particular structure described in this specification and shown in the drawings but may include other embodiments and modifications utilizing the concepts and teachings of the invention.

What is claimed is:

1. A transfer system for conveying workpieces along a path extending through successive work stations, said system comprising:
   a series of pallets adapted to support and convey workpieces along said path;
   a guide means extending along said path and movably supporting and guiding said pallets in successive relationship along said path;
   a reciprocating pallet driving member extending along said path and passing adjacent said pallets;
   means for cyclically reciprocating said pallet driving member through forward and rearward strokes;
   engagement means on said driving member to engage said pallets and carry them forward during its forward stroke;
   means to disengage said driving member from said pallets during its rearward stroke, and;
   releasing means for automatically disengaging said driving member from a pallet during the forward stroke of said driving member when said pallet either arrives at a work station or nears a preceding pallet so that said pallet can remain stationary during the following forward stroke of said driving member, said releasing means including a movable dog located on each pallet and means on each pallet for moving the dog of a following pallet to its disengaging position when said following pallet nears the preceding pallet.

2. The system of claim 1 wherein:
said releasing means includes means at a work station for moving the dog on each pallet to its disengaging position when said pallet arrives at said work station.

3. The system of claim 2 wherein:
said means at a work station for moving the dog on each pallet includes a cam adapted to be selectively moved into position to engage a movable dog on a pallet arriving at the work station for camming the movable dog to its disengaging position.

4. The system of claim 1 wherein:
said movable dog includes a roller for engaging said driving member.

5. The system of claim 1 wherein:
said means on each pallet for moving the dog on a following pallet includes a cam positioned to engage said movable dog on the following pallet and to cam the movable dog to its disengaging position.

References Cited

UNITED STATES PATENTS

| | | | |
|---|---|---|---|
| 2,885,969 | 5/1959 | Kay et al. | 198—19 XR |
| 3,197,023 | 7/1965 | Achammer | 198—221 |
| 3,286,652 | 11/1966 | Ringwood et al. | 104—162 XR |
| 3,361,250 | 1/1968 | Pierce et al. | 198—221 |

ROBERT G. SHERIDAN, Primary Examiner

U.S. Cl. X.R.
198—221; 104—162